United States Patent
Monnie et al.

(10) Patent No.: US 7,543,301 B2
(45) Date of Patent: Jun. 2, 2009

(54) SHARED QUEUES IN SHARED OBJECT SPACE

(75) Inventors: David J. Monnie, Portland, OR (US); Robert Bretl, Portland, OR (US); Eric J. Zoerner, Portland, OR (US)

(73) Assignee: Gemstone Systems, Inc., Beaverton, OR (US)

( * ) Notice: Subject to any disclaimer, the term of this patent is extended or adjusted under 35 U.S.C. 154(b) by 720 days.

(21) Appl. No.: 10/690,689

(22) Filed: Oct. 21, 2003

(65) Prior Publication Data

US 2005/0086237 A1    Apr. 21, 2005

(51) Int. Cl.
G06F 3/00    (2006.01)
G06F 9/44    (2006.01)
G06F 9/46    (2006.01)
G06F 13/00   (2006.01)

(52) U.S. Cl. .................................................. 719/312
(58) Field of Classification Search ................. 719/312, 719/314; 705/42; 713/167
See application file for complete search history.

(56) References Cited

U.S. PATENT DOCUMENTS

| | | |
|---|---|---|
| 6,247,025 B1 | 6/2001 | Bacon |
| 6,681,226 B2 | 1/2004 | Bretl et al. |
| 6,738,977 B1 | 5/2004 | Berry et al. |
| 6,829,769 B2 * | 12/2004 | Cranston et al. ............ 719/312 |
| 7,017,160 B2 * | 3/2006 | Martin et al. ............... 719/315 |
| 7,131,120 B2 | 10/2006 | Veselov |
| 7,143,392 B2 | 11/2006 | Li et al. |
| 7,152,231 B1 * | 12/2006 | Galluscio et al. ............ 719/312 |
| 7,171,663 B2 | 1/2007 | Moore et al. |
| 7,188,145 B2 | 3/2007 | Lowery et al. |
| 2001/0014905 A1 | 8/2001 | Onodera |
| 2003/0097360 A1 * | 5/2003 | McGuire et al. ............... 707/8 |
| 2004/0025171 A1 | 2/2004 | Barinov et al. |
| 2004/0199828 A1 | 10/2004 | Cabezas et al. |
| 2005/0086656 A1 | 4/2005 | Whitlock et al. |

OTHER PUBLICATIONS

Jaworski, Jamie, "Java 1.1 Developer's Guide," Second Edition, Sams.net Publishing, 1997; pp. 3-10 and 983-990.*
Glass, Graham, "Web Services Building Blocks for Distributed Systems," Prentice Hall PTR, 2002; pp. 55-70.*
Silberschatz et al., "Applied Operating System Concepts," First Edition, John Wiley & Sons, Inc., 2000; pp. 61-64, 74-77, 507-518.*
Jaworski, Jamie, "Java 1.1 Developer's Guide," Second Edition, Sams.net Publishing, 1997; pp. 17-20, 90-92, 372-383.*
Silberschatz et al., "Applied Operating System Concepts," First Edition, John Wiley & Sons, Inc., 2000; pp. 87-114.*
Jon Meyer & Troy Downing, "Java Virtual Machine" user's manual, 1997 O'Reilly & Associates, First Edition, California USA.
Barry Burd, "Java2 for Dummies" user's manual, 2001 Hungry Minds, Inc., New York USA.

(Continued)

Primary Examiner—Meng-Ai An
Assistant Examiner—Nathan Price
(74) Attorney, Agent, or Firm—Chernoff, Vilhauer, McClung & Stenzel

(57) ABSTRACT

A system for sharing queues among multiple applications each running inside its own virtual machine.

42 Claims, 11 Drawing Sheets

OTHER PUBLICATIONS

K. Mani Chandy & Leslie Lamport, "Distributed Snapshots: Determining global States of Distributed Systems," ACM Transactions on computer Systems, vol. 3, No. 1, Feb. 1985, pp. 63-75.

Carl W. Olofson & John Humphreys, "White Paper: Overcoming the Data Bottleneck to Deliver Dynamic IT: GemStone's GemFire with IBM's BladeCenter," Publication of IDC Information and Data, Copyright 2005 IDC.

"Performance, Availabiltiy and Real-time Intelligence for Online Portals—Achieving this triple convergence with the GemFire Enterprise Data Fabric (EDF)," GemFire EDF Technical White Paper, Copyright 2005 by GemStone Systems, Inc., 15 pages.

"GemFire Enterprise," GemFire Enterprise Technical White Paper, Copyright 2007 by GemStone Systems, Inc., 26 pages.

Kim Haase, "Java™ Message Service API Tutorial"; 2002; Sun Microsystems, Inc., 278 pages.

* cited by examiner

SHARED QUEUES IN SHARED OBJECT SPACE

BACKGROUND OF THE INVENTION

The present invention relates to a system for sharing queues among multiple applications each running inside its own virtual machine.

Computer hardware and storage media can only create, store, and process binary information, i.e. information written using only two digits, "0" and "1". A compact disc, for example, has a surface subdivided into tiny sections that are either pitted (1) or not pitted (0) such that a laser can detect the presence or absence of pits. Similarly, microprocessors have inputs and outputs to which a reference voltage either is (1) or is not (0) present. (Microprocessors repeatedly measure the voltage at each input and output at regular intervals, or cycles—hence the speed of a processor is expressed in cycles per second, or "Hertz.") Accordingly, any computer program, as well as any data used in that computer program, must first be expressed in binary code for a computer to run the program or process the data.

Though binary code is conceptually simple, its use to perform computerized tasks introduces two drawbacks. First, binary code is a relatively inefficient way to express information. As a simple example, the number "100" in decimal notation is expressed as "1100100" in binary code, and therefore must at a minimum occupy seven "pits" on a compact disc and/or occupy either a single input of a processor for seven cycles (if entered serially) or seven inputs for one cycle (if entered in parallel). In technical terms, the space that a piece of information occupies, or alternatively the number of time cycles a piece of information occupies, is referred to in "bits." That is to say, the number "100" is a 7-bit number because it takes seven digits to express in binary code. The number "101" is also a 7-bit number, coded as 1100101, as is every number between "64" (1000000) and "127" (1111111).

In computer applications, binary code is even more inefficient because computerized information is, by convention, typically expressed in multiples of 8 bits, e.g. 8-bit, 16-bit, 24-bit, etc. The reason for this convention is that a computer processing or storage device has no physical way of distinguishing when one number ends and another number begins. Accordingly, the convention is to write a program that specifies the bit-rate, i.e. the number of bits that each piece of data processed in the program will occupy. If a program is written in 8-bit code, for example, every piece of data occupies eight bits, e.g. the number 0 is coded as 00000000, the number 1 is coded as 00000001, and the number 255 is coded as 11111111. In 8-bit code, therefore, every piece of data has a value between 0 and 255 and every piece of data occupies 8 bits even if it could theoretically be represented by a single bit. If a program requires that any piece of data take on a value greater than 255, the bit-rate for the program must be increased incrementally to 16-bit, 24-bit, etc. as appropriate.

A computer program operating in binary code may therefore use a tremendous amount of storage space and processor cycles, particularly when graphics are involved. For example, a photographic quality image is often coded at 24-bits for every pixel. If the image resolution is 2 million pixels, as is common with today's digital cameras, each image would occupy 48 million bits, or 4 Megabytes, where a byte is defined as 8 bits per byte (due to the convention of expressing binary code in multiples of 8 bits). Manipulating that image would similarly require 48 million cycles of processor time for each manipulation. The amount of storage space and processing time increases exponentially when manipulating video because the computer system must process and store many such images every second. In addition, there are many other computer applications that are at least as intensive as image processing. Applications of such intensity tend to slow considerably as data is "bottlenecked" in the computer system.

One way of minimizing the impact of the inefficiency of binary code has been to increase the amount of storage space and processing speed of computers. For example, personal computers sold commercially today offer up to 300 gigabytes (300 billion bytes) of hard drive storage, 4 gigabytes (4 billion bytes) of temporary memory storage, and processing speeds of over 4 gigahertz (4 billion cycles per second). Business computers, such those used in the motion picture industry are even faster and include more storage. In other words, as computer applications have demanded more storage space and processing time, the computers have become faster with higher storage capacity. Still, while these numbers are impressive, computer systems are not sufficiently fast as to eliminate all bottlenecks, and in fact, as computers become faster with more available storage, new applications are developed to take advantage of the improved technology so as to provide the need for even faster computers, even more storage space, etc.

Another way of minimizing the impact of the inefficiency of binary code is to write computer programs and applications as efficiently as possible. Thus there is always an emphasis on writing computer code that achieves its outcome in as few steps or calculations as possible. Similarly, a computer program should not be written in 24-bit code when only 8-bit code is required for the application, and the computer program may compress data when appropriate.

A second drawback of using binary code to perform computerized tasks is that it is impractical to write a computer program in binary code, particularly with complex programs. The first rudimentary computers, for example, were operated by mechanically toggling electrical switches between on and off states to enter a sequence of binary instructions. Computer programs simply specified the sequence of binary instructions to enter. This method was feasible so long as the program was no more than about a hundred instructions long. Beyond that point, programming directly in binary code became too complex, and programs too difficult to correct, or debug. Moreover, because the binary instructions were dependent upon the particular electrical circuitry of the computer processor and related hardware, the programmer was required to know in detail the particular architecture of the computer being used by the program.

To accommodate computer programs of increasing complexity, as well as to facilitate the introduction of personal computers into the marketplace, modern operating systems were developed. Early computer operating systems, such as Microsoft DOS, essentially acted as an interface with a computer's hardware so that a user could issue specific commands or instructions to the computer written in more ordinary language. The operating system would recognize the commands, and automatically issue the instructions to the computer in binary code. For example, in Microsoft DOS, entering the command "MEM" into the computer would result in the computer displaying the types and amounts of computer memory available. The person issuing the command did not need to know anything about binary code or the manner in which the command being entered produced the desired result. The user simply needed to either memorize or look up a set of commands in an instruction manual.

Further, early operating systems recognized simple programming such as BASIC and FORTRAN, written in terms more intuitive than binary code. In these languages, commands such as WRITE, READ, LOOP, SET and other intuitive terms provided a means to write computer programs in a manner easily learned and perhaps more importantly, in a manner more easily readable when debugging the program. A simple computer program to calculate the area of a circle, for example, might have been written in BASIC approximately in this form:

| | |
|---|---|
| 10 | PROGRAM 1 |
| 20 | WRITE "This is a program to calculate the area of a circle." |
| 30 | WRITE "Please enter the radius of the circle" |
| 40 | READ R |
| 50 | SET A=Π *R^2 |
| 60 | WRITE "The area of the circle is" R |
| 70 | END |

In this example, after a person typed "RUN PROGRAM 1", the computer would execute the command lines in numerical sequence, whereby a person would be prompted to enter the value for a radius, defined as "R", after which the computer would square that value, multiply the squared value by pi and print out the computed area. Writing this same program in binary code not only would have required much more time and effort on the part of the programmer, but the programmer also would have had to know the technical specifications of the computer processor. Obviously, the introduction of operating systems along with intuitive programming languages was a boon to both consumers and computer programmers.

A number of such operating systems and programming languages became prevalent. For example, Apple Macintosh and Microsoft Windows operating systems improved (from a consumer's perspective) upon simple text-based operating systems by allowing user to issue instructions to the computer using a point-and-click graphical interface displayed on a computer monitor. Computer applications, such as word processing programs, computer games, and a host of others took advantage of this functionality to provide products that could be used more intuitively through the graphical interface. Today, a host of operating systems are used, such as many versions of Microsoft Windows 9x, Macintosh OS, Linux, Windows NT, among others.

A wide variety of programming languages also became prevalent. At first, most new programming languages followed the model of the early FORTRAN language by structuring the programming language as a series of commands by which a programmer would issue instructions to a computer in a logical order. The most popular of these language types is a program called "C." The creation of "C" is considered by many to have marked the beginning of the modern age of computer languages. "C" successfully synthesized what had seemed to be conflicting attributes of several existing programming languages, adding new attributes to form a single, powerful structured language that also happened to be easy to learn. Moreover, it was a programmer's language. Prior to the development of "C", computer languages were generally designed either as academic exercises by engineers or designed by bureaucratic committees. "C", however, was developed by programmers, reflecting the way they approached the task of programming. As a result, "C" found wide and rapid acceptance in the programming community, attracting many followers who had near-religious zeal for it.

Once again, however, the increasing complexity of computer programs exposed an underlying flaw of "C" as well as its predecessors. Each of these programming languages requires that a program be written as a series of linear steps or instructions (with an occasional loop or branch thrown in). In fact, writing such a program is similar to constructing a geometric proof, and like a proof, once a program such as C or FORTRAN exceeds a certain number of steps (somewhere between 25,000 and 100,000 lines of code), the program becomes too complex write effectively.

Therefore a new approach to computer programming began to find acceptance in the programming community, commonly referred to as object-oriented programming. Object-oriented programming approaches a programming task in roughly the same way that a person's mind might approach that task—by abstracting a solution. Rather than defining a series of steps, or instructions by which a task could be accomplished, an object-oriented program focuses first on a program's data, defining classes of data and objects, where an object is a particular instance of a class. An object-oriented program still contains instructions, referred to as methods, which often are embedded within the classes or objects themselves. An example of a simple object oriented program that displays the volume of two boxes might look like this:

```
class Box {
    double width;
    double height;
    double depth;
    // display volume of a box
    void volume ( ) {
        System.out.print ("Volume is ");
        System.out.println (width*height*depth);
    }
}
class BoxDemo {
    public static void main (String args[ ] ) {
        Box mybox1 = new Box ( );
        Box mybox2 = new Box ( );
        // assign values to mybox 1's variables
        mybox1.width = 3
        mybox1.height = 20
        mybox1.depth = 15
        // assign values to mybox2's variables
        mybox2.width = 3
        mybox2.height = 6
        mybox2.depth = 9
        // display volume of mybox1
        mybox1.volume ( );
        // display volume of mybox2
        mybox2.volume ( )
```

In this example program, a box class is first defined having the variables of width, height, and depth (the term "double" identifies the type of number that the variable is allowed to be). The box class also defines a method to display the volume of an object box of this class by multiplying width by height by depth. Once this class has been defined, the program defines a second class BoxDemo which includes two objects of the initial box class. The class BoxDemo then twice calls the method of the first box class for displaying the volume of a box, once to display the volume of mybox 1 and once to display the volume of mybox2.

Object oriented programming has quickly gained widespread popularity. One particularly popular object oriented language is called Java, which is the programming language used in the foregoing example (Java is a trademark of Sun Microsystems Inc.). The reason Java has become so popular is its versatility in defining classes and objects, as well as its ability for one class or object to call functions in other classes and objects as well as to reuse data in other objects simply by referencing the function or the data. In Java, therefore, it is very easy to create multiple variations of a defined class, to create new variations of an old class, and to reuse a method previously defined by one class in a new class. Parenthetically, another object oriented programming language that has become popular is C++, which expands C to include the functionality of both object oriented programming and the instruction oriented programming of C.

Java, like any other programming language relies upon an interface to convert the program to the required binary instructions. With Java, this interface is called a "Virtual Machine" (VM) because the interface behaves as if it were a computer unto itself. Every time a Java based computer application is initiated, the application initiates a VM to run the application. The Java VM will be described in much greater detail later in this specification, but several important principles will be introduced now. First, while the input to a Java VM is always the Java programming language, the output of a Java VM is customized to the particular platform, or operating system, that hosts the Java VM. In other words, every Java application must be customized to the host operating system so that the VM that it creates is capable of converting the Java programming language to the commands unique to the host operating system, which in turn issues the appropriate binary instructions to the computer.

Second, Java VMs are designed to be independent of one another. If two Java applications are running on the same computer, each application creates its own VM which is self sufficient, i.e. neither VM needs rely upon the VM of the other application. If one application should close, the other application will not be affected. This often becomes problematical, however. Recall that even with today's processors and storage devices, a computer's resources may still be strained by intensive applications. With multiple Java applications running simultaneously, each creating its own VM, system resources may be strained and slowdowns may result. In other words, there is often a trade off between the desired independence of multiple Java applications and the speed at which the applications may run.

Third, the creators of the Java VM, Sun Microsystems, emphasized uniformity of the Java VM with respect to all of the host operating systems. Thus, while the "guts" of each VM will of necessity be different across each platform, a user of a Java VM was not intended to be able to recognize any difference, seeing the same functionality regardless of the host platform. This, however, became problematical. Many operating systems offer unique features not available to other operating systems. Thus a business operating on Windows NT might desire to have a Java VM, and hence the Java application running the VM, take advantage of that unique functionality. The same would hold true for a user of a Macintosh or a Linux system, or a Windows 9x system, etc. Therefore, although Sun Microsystems's Java VM is uniform across all platforms, an industry has blossomed by which Java applications may be truly customized to a host operating system whereby the features of the host operating system are more fully exploited, and custom tailored to the particular needs of the business or person running the application.

This diversity among Java VMs tends to hinder the improvement of the Java VM and the programming language because many such improvements are tied to the particular species of Java VM upon which the improvement was developed. Many businesses may like the particular improvement, but dislike other aspects of the Java VM. In that instance, a business with its own custom or proprietary VM would have the options of buying the new VM with its perceived advantages and faults, or spend the time and resources to engineer its own VM, which it likes, to include the new improvement. Exacerbating this problem is that the new improvement may be proprietary, thus eliminating the second option.

What is desired then, is an improved system for implementing object-oriented computer applications that both efficiently allocates computer hardware resources among multiple computer applications running simultaneously on the same computer or network of computers, or among multiple threads of a single computer application running on a computer or network of computers, while also preserving the independence of multiple, simultaneous applications. What is further desired is such an improved system that is sufficiently flexible so as to be compatible not only with the diverse range of existing object-oriented computer applications, but also with object-oriented applications that are developed or modified in the future.

DETAILED DESCRIPTION

Figure 1:
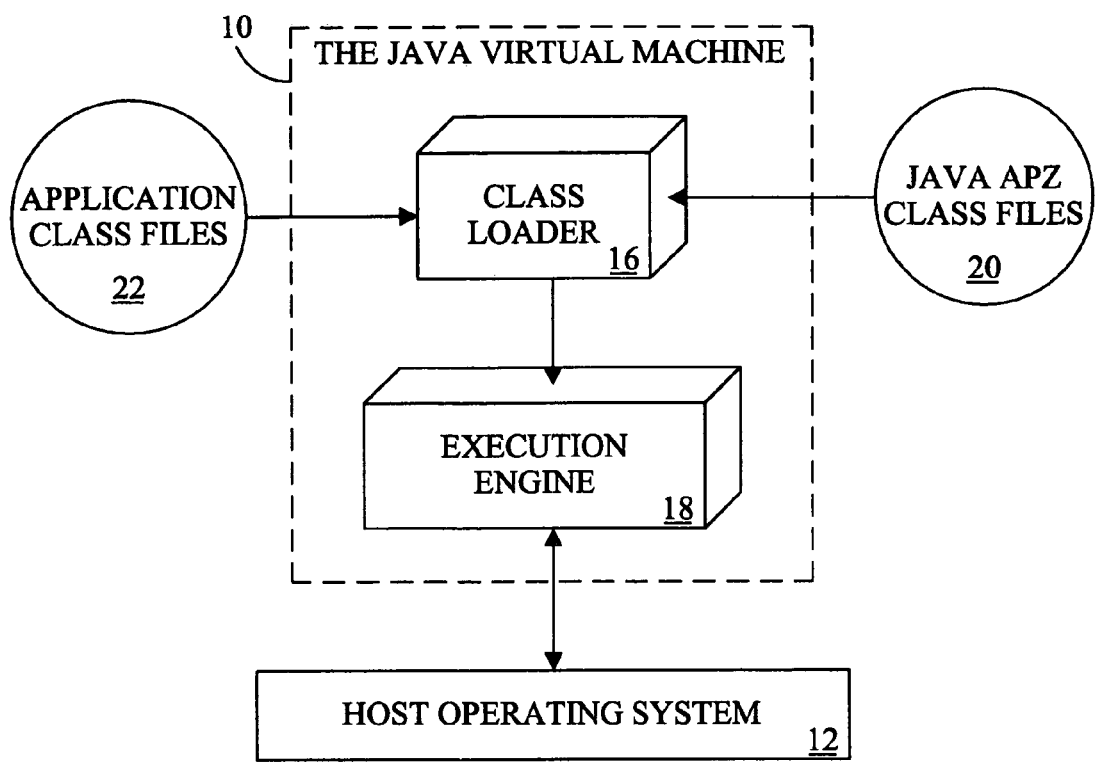
FIG. 1 is a simplified architectural schematic of an existing VM.

FIGS. 1-4B show a simplified architectural schematic of an existing virtual machine (VM) 10 as defined by Lindholm, Tim and Yellin, Frank (1999). THE JAVA VIRTUAL MACHINE SPECIFICATION, SECOND EDITION. Reading, Mass. Addison-Wesley. known as a JAVA virtual machine or Java VM, although it should be understood that other types of VMs besides Java may also have the features shown in FIGS. 1-4B. Referring specifically to FIG. 1, when a Java application is initiated on a host computer with a host operating system 12, the Java virtual machine (VM) 10 loads the application which may include a class loader 16 and an execution engine 18. Although FIG. 1 indicates a single class loader, in actuality, a Java VM may include multiple class loaders. Thus the class loader 16 may be considered a subsystem that may involve many class loaders. The Java VM 10 has a flexible class loader architecture that enables a Java application to load classes in custom ways.

Specifically, the class loader 16 may comprise a system class loader and one or more user-defined class loaders. The system class loader is a part of the Java VM implementation and loads classes, including the Java application programming interface (API) class files 20, in some default way and usually from the local disk of the host computer. As previously stated, the particular default manner in which the system class loader loads classes is specific to the particular VM implementation being used and may be customized. The term "system class loader" is sometimes referred to as a "primordial class loader", a "bootstrap class loader", or a "default class loader."

At run time, a Java application may also load application class files 22 in custom ways through user-defined class loaders, such as by downloading class files across a network. While the system class loader is an intrinsic part of the VM implementation, the user-defined class loaders are not. Instead, user-defined class loaders are written in Java, compiled to class files, loaded into the virtual machine, and instantiated just like any other object, becoming a part of the executable code of a running Java application. User defined class loaders enable a programmer to dynamically extend a Java application at run time. As the application runs, it can determine what extra classes are needed and load them through one or more user-defined class loaders. Because the user defined class loaders are written in Java, classes can be loaded in any manner expressible in the Java programming language.

For each class loaded by the virtual machine 10, the virtual machine 10 records which class loader loaded the class. When a loaded class refers to another class, the virtual machine 10 requests the referenced class from the same class loader that originally loaded the referencing class. For example, if the virtual machine 10 loads the class "Volcano" through a particular class loader, it will attempt to load any classes to which Volcano referred with the same class loader. In this way, Java's architecture enables a programmer to create multiple "name spaces" inside a single Java application. Each class loader in the executing Java application has its own name space, which is populated by the names of all the classes it has loaded.

The execution engine 18 executes instructions contained in the methods of loaded classes in "bytecode", essentially Java's machine language. The Java specification describes what is to result from a given instruction retrieved from a Java method, but a programmer of a Java application determines the best way of achieving the result using software, hardware, or a combination of both. The execution engine 18 is an abstraction; Java is a programming language capable of simultaneously running multiple threads, i.e. distinct paths of execution, hence the execution of each thread can be considered an "instance" of the abstract execution engine 18. Thus at any given time, there may be multiple "instances" of the execution engine 18.

The execution engine 18 receives a bytecode stream of instructions in a thread and executes the thread one instruction at a time. The execution engine 18 executes the actions requested by each thread, and whenever intended by the Java application, sends instructions to the operating system in the code that the operating system recognizes. From time to time, the execution engine 18 might encounter an instruction that requests a method written in some other language than Java, referred to as a "native method." On such occasions, the execution engine 18 will attempt to invoke that native method by accessing native method libraries 36 through a native method interface 34 (shown in FIG. 2). When the native method returns, the execution engine 18 will continue executing the next instruction in the bytecode stream.

When the Java virtual machine 10 runs an application, it needs memory to store many items, including information it extracts from class files, objects that the program instantiates, parameters to methods, return values, local variables, and intermediate results of computations. The Java VM 10 organizes the memory it needs to execute a program into several runtime data areas, depicted in FIG. 2. These runtime areas may include a method area 24, a heap 26, one or more Java stacks 28, one or more program counter (PC) registers 30, and one or more native method stacks 32. Although the same runtime data areas exist in some form in every Java VM implementation, the structural details of these areas are left to the designers of the VM and may therefore vary considerably from one Java application to another,.

Each instance of a Java VM 10 has one method area 24 and one heap 26. These areas are shared by all threads running inside the VM 10. As each thread comes into existence, it receives its own PC register 30 and Java stack 28. When the VM 10 runs a method contained in a thread, several things happen. First, the value of the PC register is used to tell the next instruction in the method's sequence to execute. Second, the thread's java stack 28 stores the state of each executing Java method in a stack frame, which includes the thread's local variables, the parameters with which it was invoked, its return value if any, and intermediate calculations. When the VM 10 has invoked a method in a thread and that method subsequently completes, the VM 10 discards the stack frame for that method from the Java stack 28. The state of native method invocations is stored in the native method stack 32 in a manner dictated by the designer of the Java VM 10.

Information about loaded data types are parsed from class files as they are loaded and stored in the method area 24. A data type refers to the format in which the data is expressed, e.g. an integer, a float, etc. A data type could also be an address of an op code within a method or a reference to an object on the heap 26. The VM 10 uses the type information stored in the method area 24 as it executes the application it is running.

For each data type the VM 10 loads, it should store the following kinds of information in the method area: (1) the fully qualified name of the type; (2) the fully qualified name of the type's superclass; (3) whether or not the type is a class or an interface; (4) the type's modifiers; (5) an ordered list of the fully qualified names of any direct superinterfaces; (6) the constant pool for the type; (7) field information; (8) method information; (9) all class variables declared in the type except constants; (10) a reference to class CLASSLOADER; and (11) a reference to class CLASS. Each of these kinds of information is well known to those in the art who design Java virtual machines and program in Java.

Figure 3:
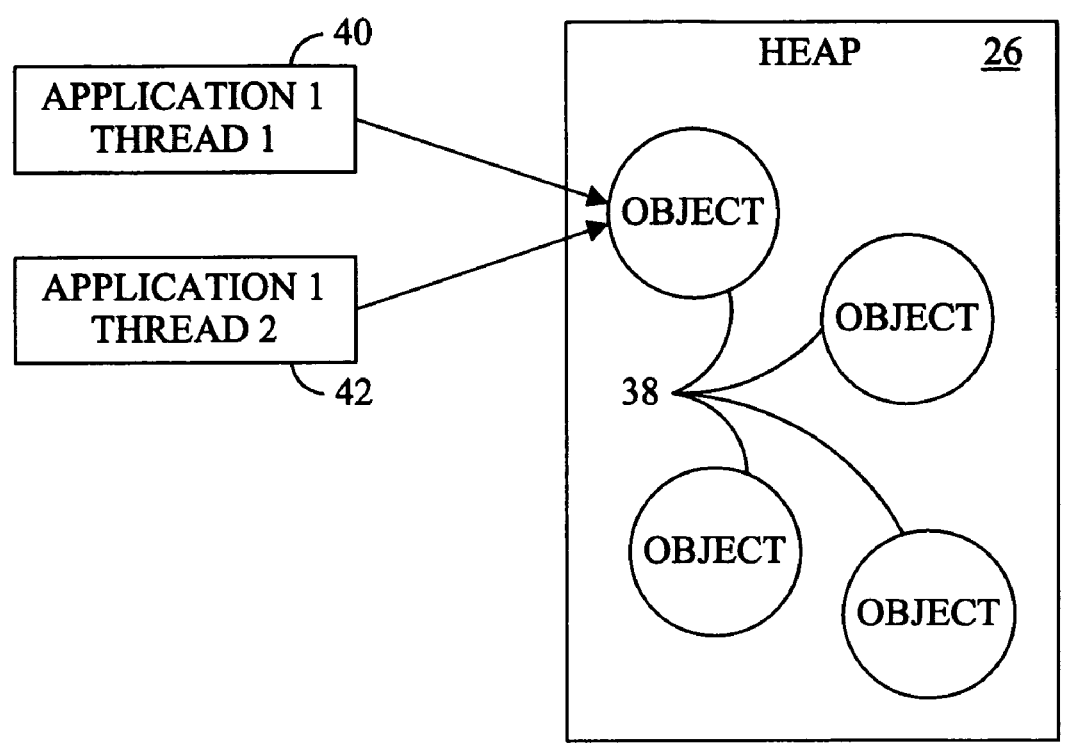
FIG. 3 is a schematic of the heap shown in FIG. 2.

Referring to FIG. 3, whenever an object 38 is created by a Java application, memory for the new object 38 is stored in the heap 26. Because there is only one heap 26 inside of any instance of a Java VM 10, all threads share the heap 26 and because each Java application runs inside its own Java VM 10, there is a separate heap 26 for every Java application running. In this manner, one Java application cannot affect the objects 38 in the heap 26 of another application. Two different threads 40 and 42 of the same application, however, could affect each other's heap data, i.e. the objects 38. For this reason, synchronization of the access to objects of multiple threads must be planned.

Figure 2:
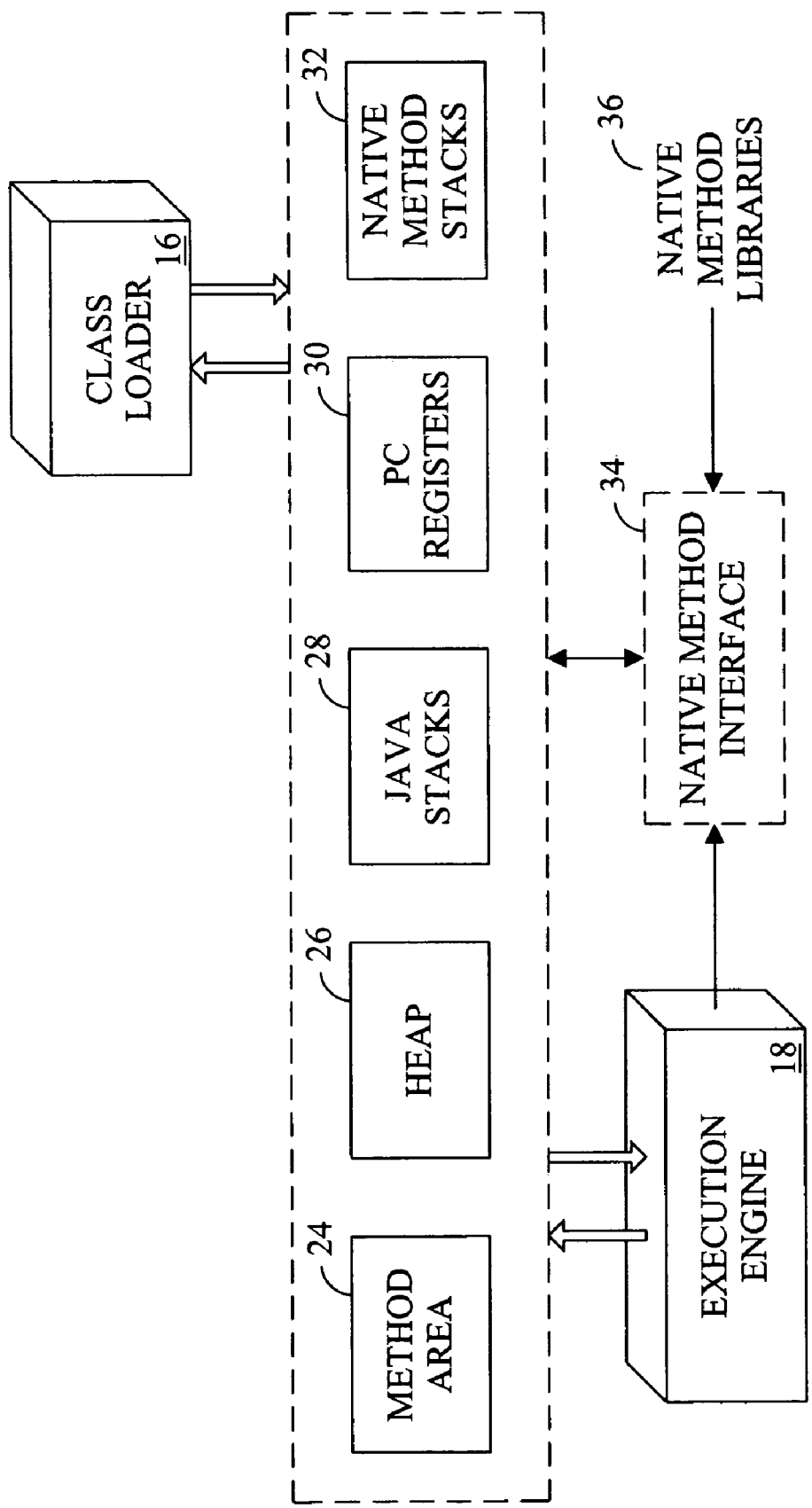
FIG. 2 is an expanded architectural schematic of the VM of FIG. 1 showing a memory region interposed between the class loader and the execution engine.
Figure 4A:
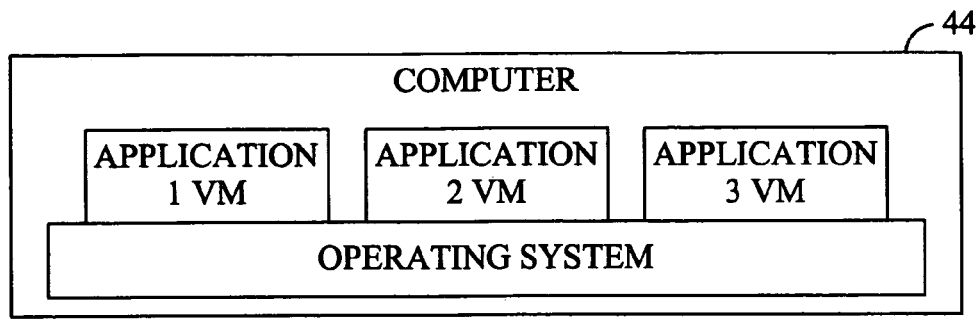
FIG. 4A is a diagram showing a prior art system for operating multiple VM applications on a host computer.
Figure 4B:
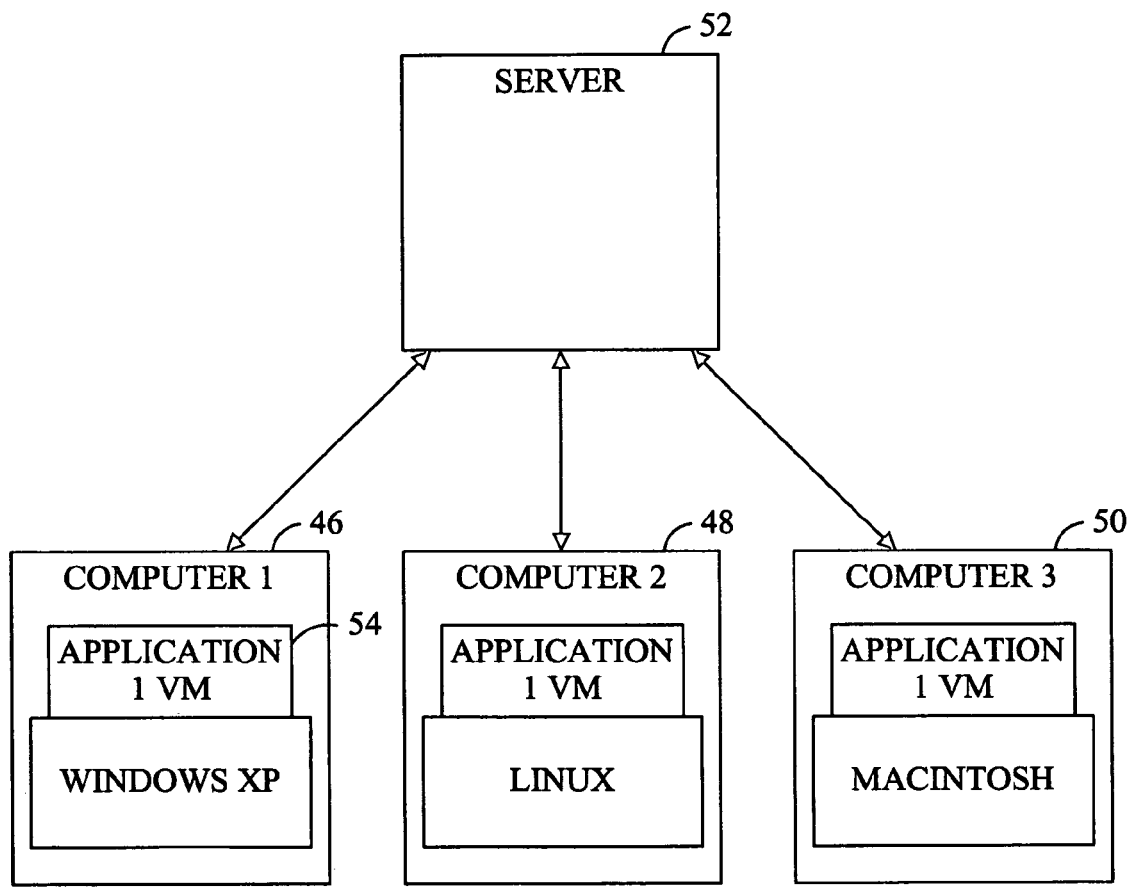
FIG. 4B is a diagram showing a prior art system for the simultaneous operation of multiple instances of a VM application on several host computers connected through a network or internet server.

The existing Java VM 10, as illustrated in FIGS. 1-3 has several disadvantages. First, it is inherently redundant. Referring to FIGS. 4A and 4B, a single computer when running multiple Java applications (or other applications that run in a VM) typically create a separate VM for each application. Each VM, in turn, generates its own method area, heap, PC register, etc., using a good deal of the resources of the underlying computer. This is true even when each VM is running a separate instance of the same application where many of the objects created by the application will be identical. This is illustrated in FIG. 4B where three computers 46, 48, and 50 are running the same application 54 through a server 52. In this instance, many of the runtime data areas may be located on the server 52, creating the same kind of redundancy as seen in FIG. 4A.

The redundancy of existing VM systems translates to a loss in system speed for two reasons. First, each VM must use its own resources, i.e. time, to load objects already loaded in other applications. Second, the combined memory space of all VM applications often bottlenecks system resources. In many cases, the speed at which an application or series of simultaneously running applications may operate defines the upper limit of a system's performance—the number of trades processed, web pages served, or billing records updated per second. In other words, the speed at which individually well-tuned processes can operate determines how much value that system can provide on a second-to second basis, i.e. lost system speed means lost revenue.

The existing wisdom is that the redundancy and the associated loss of speed that results from designing every VM application to run in its own isolated VM 10 is a small price in exchange for the assurance that one application cannot change or otherwise corrupt the data being used by another application. In addition, the isolation of applications each within its separate VM ensures that if one application should close, or suddenly crash, the other applications would remain unaffected. The present inventors, though, came to the realization that there are a variety of applications in which the sharing of data across applications might actually be beneficial. In those instances, the redundancy of the existing system for running VM applications and the associated loss of system speed would be needless.

Figure 5:
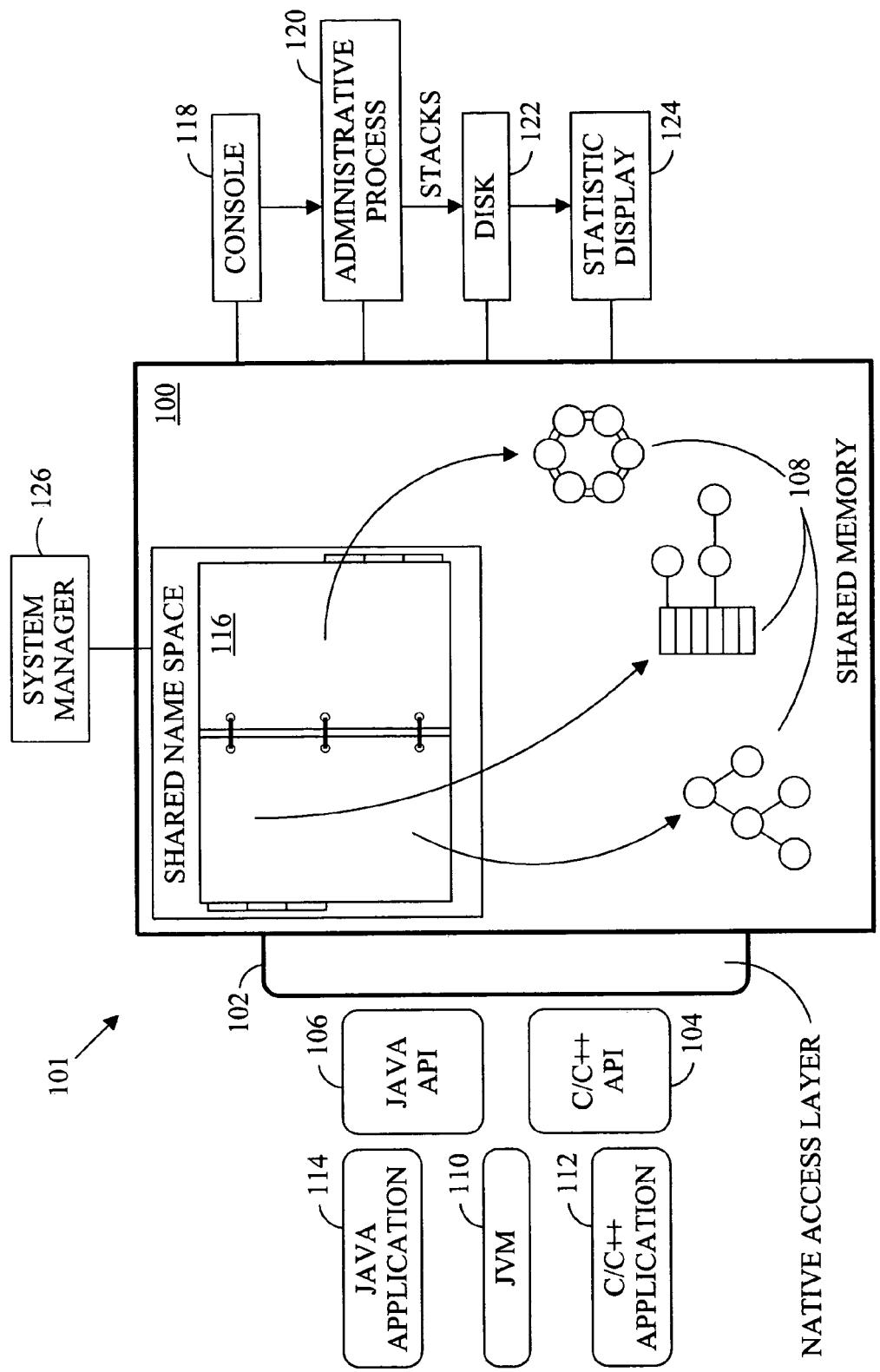
FIG. 5 is a diagram showing a first improved system for operating multiple VM applications on a host computer.

With this in mind, FIG. 5 shows an improved system for running VM applications, which broadly stated may comprise a shared object space 100 and a native access layer 102 operably connectable with a plurality of application programming interfaces (API) 104, 106 of independent VMs or other applications such as the C/C++ application 112. The access layer 102 permits each application 112, 114, through its associated, API 104, 106 to load objects 108 into the shared object space 100 where the objects 108 may be read and/or modified by the particular applications 112, 114. Although in some instances, the individual applications may duplicate some of the objects 108 stored in the shared object space 100 within its own respective heap or other memory area, the shared object space 100 permits an application to store an object 108 in the shared object space 100 instead of its own heap or other memory area, thus avoiding the redundancy of existing VM systems. Access to the objects 108 in the shared object space 100 may be synchronized for controlling access to shared objects in a heap by multiple concurrently running threads. Further, the shared object space 100 will store an object 108 so long as a thread of any connected application is using the object 108. In this manner, even if the application that placed a particular object in the shared object space 100 closes or crashes, that object will still be available to other applications as necessary. Thus the shared object space 100 permits multiple applications running simultaneously on a system or network to enjoy the stability of existing VM systems, while providing a substantial boost in performance.

The shared object space 100 is accessible to an application through the native access layer 102. Thus a Java application or other object oriented application will recognize the shared object space 100 as simply another resource accessible through the native methods interface that already exists in Java and other object-oriented applications. Once accessed, all the functionality of the shared object space 100 will be instantly accessible to the connected application. Further, the shared object space 100 does not need to be tied to a particular VM, but instead is backwards compatible with any individual VM, whether it is a standard Java VM provided by Sun Microsystems or a customized VM of a particular business, and forwardly compatible with any VM including improvements that have yet to be developed. Thus the versatility of the shared object space 100 can not be overstated. The versatility of the shared object space 100 is furthered by its compatibility with a wide variety of application interfaces. As can be seen in FIG. 5, the native access layer 102 provides access to the shared object space 100 by both Java applications and C or C++ applications. It should be understood that these examples are illustrative only, and that the native access layer 102 could provide access to the shared object space 100 by a number of other application types, whether object-oriented like Java or command oriented like C or C++.

The advantages of the shared object space 100 are readily apparent, particularly with respect to applications that benefit from the ability of multiple, simultaneously running applications to update a shared object rather than simply read or copy a shared object. One such application might be online trading. As the popularity of online trading increases, trading exchanges are faced with ever-growing volumes of market data and concurrent trader activity. Systems that were built to handle moderate volumes now have to handle thousands of traders and billions of dollars in daily transactions. Such systems have to accommodate huge spikes in demand. For instance, a single trade may require thousands of traders to be notified. Many traders watch for these price changes, then jump in to sell or buy very quickly, causing even more notification demand and more trading volume. The faster a trading system reacts to changes, the more transactions an exchange can execute, increasing its commissions while maximizing trader satisfaction with the service.

Another example of the utility of the shared object space 100 might be its potential in improving speed of computerized activity in the telecommunications industry. Modem telecommunication networks have to process vast amounts of data very quickly. Every time a call is placed, for example, an application needs to access the customer's subscription information, apply any special discounts that may be applicable, monitor the call duration and establish a rate based on the time and distance to the terminating number. Given that the number of such calls can run into the thousands at any given moment, a memory based data sharing facility is a necessity. In the past, such telecommunications applications have been written from scratch in C at enormous expense. The availability of an off-the-shelf shared memory component that provides a shared object space 100 makes it possible to write such systems in Java or another object-oriented program more quickly, cheaply, and with less risk.

Yet another example of the utility of the shared object space 100 is its potential use in large scale internet applications. Large internet content syndication and portal applications depend on fast caching for scalability. The shared object space 100 provides an ideal caching facility for HTML and XML fragments, XML DOMs and streams, HTTP session information, and JDBC query results. It can also hold very fast page request queues and other operational data structures.

The shared object space 100 may include multi-language support which may be exploited when connected to web servers, servlet engines, content management suites, and XML transcoders to speed up every phase of a sites operation.

In use, the shared object space 100 may be one element in a larger computing system 101. Specifically, it is anticipated that the shared object space 100, along with its associated native access layer 102 may be used in conjunction with a console 118, an administrative processor 120, disk storage 122 and a display 124 suitable for displaying system statistics. The console 118 is used to configure and start the system 101 which may comprise a system manager 126, the shared object space 100, and the native access layer 102. The system manager 126 creates and initializes the shared object space 100, collects garbage, gathers statistics, and logs both system and user-defined events. Once the system 101 has been started, the system manager 126 can also be used to browse the shared object space 100, enable statistics collection from individual objects, and display the statistics graphically for analysis.

The system 101 is preferably stored on a disk 122 in a default directory, e.g. "defaultSystem", that holds the system's configuration file and log file. The system 101 may be included on an executable storage media such as a compact disk that include an installation tool that may be used to create the requisite directories on the disk 122. Additional custom system directories may also be installed on the same disk 122 as desired. Preferably, the system 101 includes a number of default tools that operate on the default system; however the console 118 and a command line utility may allow the user to specify a different system.

To make use of the system 101 and its shared object space 100, the system 101 includes a library file in the default directory. Java applications should include a reference to this library (e.g. productdir/lib/gemfirejar) on its CLASSPATH. On Windows systems, the library may be made available by adding productDir/bin to PATH and on Solaris, the library can be made available by adding productDir/lib to LD_LIBRARY_PATH. An application process connects to the system 101 by making a call that contacts the system manager 126, such as GemFireConnection.myConn=GemFireConnection.getinstance ("Gemfire"). The system manager 126 then returns information that enables the application process to map the shared object space 100 into its address space.

Each system 101 preferably maintains a global name space 116 in the shared object space 100. The name space 116 provides a fast object registry in which applications can register and look up "root" objects by name. Objects that are referenced from this name space are protected from garbage collection. Once connected to the system 101, an application can look up shared objects in the name space 116 with a command such as Stock myStock=(Stock)
myConn.lookup("GSI")

A shared object like myStock always represents a current shared value; that is all threads in all VMs always see the same field values, just as all threads in a single VM see the same volatile field values for an object in that VM. The statement myStock.getPrice( )

for example, might return the price most recently set by a local or remote thread, while the statement myStock. setPrice(34)

immediately updates the shared view of myStock's price. Because these fetches and updates incur no disk or network overhead, they are much faster than the same operations implemented through mechanisms like RMI and they outperform JDBC calls by an even wider margin.

The system 101 may include a Class Enhance tool that prepares an application class for sharing by modifying the class's bytecodes to provide transparent instantiation in shared memory and automatic read-through and write-through for field access methods. By default, all fields may be shared, but a user may establish more selective policies by providing an XML description of the fields to be shared in each domain class. Once a class is enhanced, making an object of that class automatically puts the object into shared memory.

Figure 6:
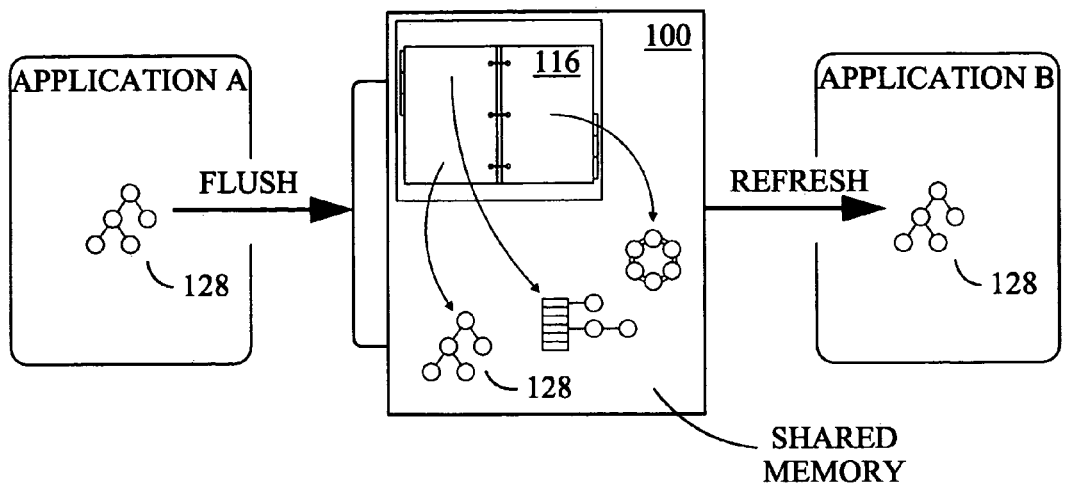
FIG. 6 is a diagram showing a first manner in which objects may be shared between applications using the system of FIG. 5
Figure 7:
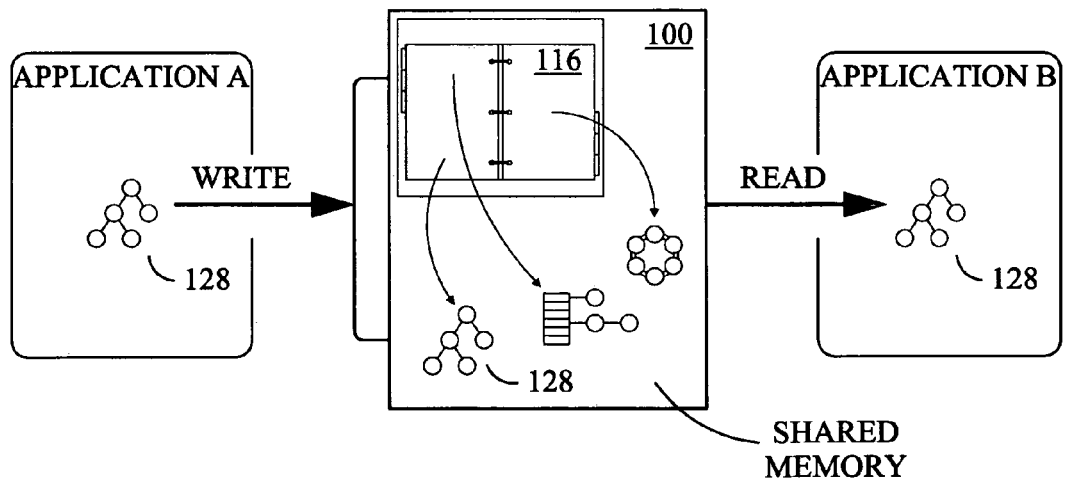
FIG. 7 is a diagram showing a second manner in which objects may be shared between applications using the system of FIG. 5

Referring to FIGS. 6 and 7, the system 101 may support two methods of sharing objects, copy sharing and direct sharing. An object 128 that is copy shared is allocated twice, once in the local memory of an application and again in shared memory 100. FIG. 6 shows an example of a copy sharing method where application A creates an object 128 in its local address space. The object 128 is shared by putting it into the shared name space 116. At this point, the object 128 is not immediately written to a field in the shared object space 100; instead the object 128 is written to shared memory 100 only after a user "flushes", i.e. updates the object to a new version, for the first time. Once an object 128 is written to shared memory, application B is able to copy the object 128 to its local memory by accessing the shared object 128 by name in the shared name space 116. Application B may modify the copy of the object 128 obtained from shared memory, and may also flush to update the shared memory copy of the object. If application B wishes to see the most recently updated version of the object 128, a refresh command may be used.

FIG. 7 shows an example of a direct sharing method, which is a one-space model where some of all of the non-static fields of the shared object 128 reside only in shared memory. Static fields may be kept in the local heap of an application's VM for performance reasons. An assignment to a field of a directly shared object 128 is immediately visible to threads of other applications and each application is able to write to the shared object. When the field is read, the current state in shared memory 100 is returned; there is no need to refresh the local memory.

Figure 8:
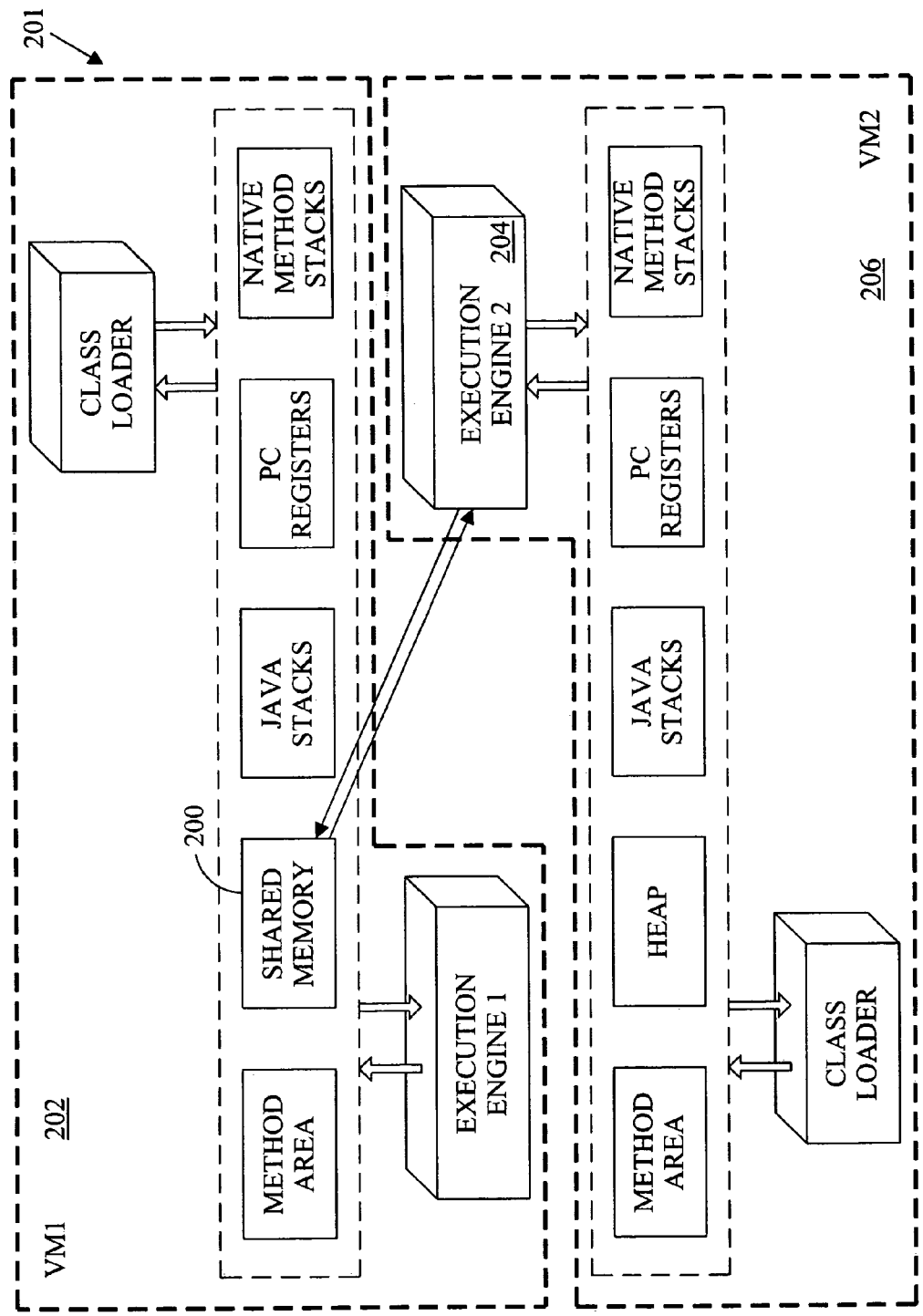
FIG. 8 is a second improved system for operating multiple VM applications on a host computer.

FIG. 8 shows another system 201 that includes a shared object space 200 within a first Java VM 202. The first Java VM 202 may include all the elements of a typical Java VM as previously described, i.e. a method area, a class loader, an execution engine, etc. The heap of the first Java VM, however, acts as the shared object space 200 so as to be accessible by the execution engine 204 of a second Java VM. In the system 201, the first instance of an application may initiate a VM whose heap performs as a shared object space for subsequent instances of applications operating on the same computer. The shared object space 200 may have all the functionality of the shared object space 100 previously described.

Figure 9:
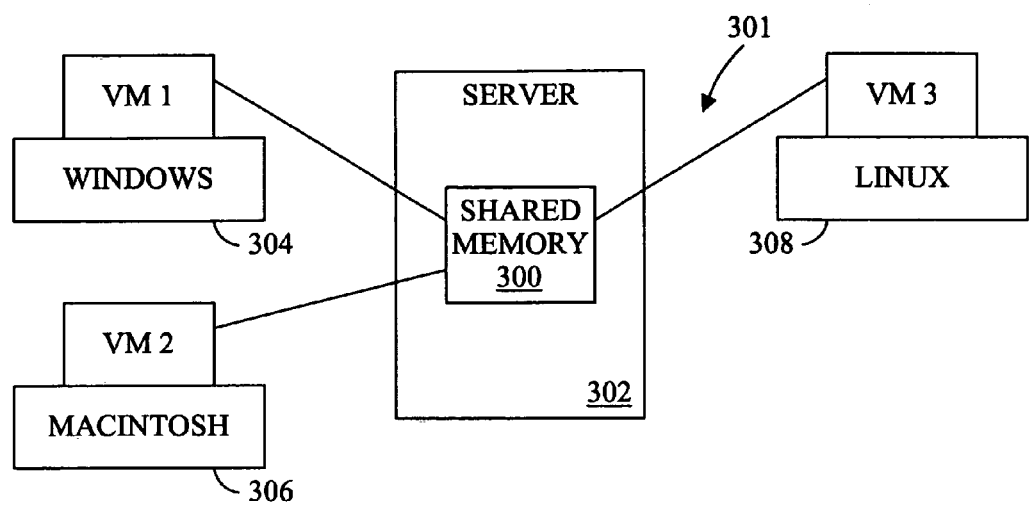
FIG. 9 is an improved system for the simultaneous operation of multiple instances of a VM application on several host computers connected through a network or internet server.

FIG. 9 shows another system 301 in which a shared object space 300 resides on a server 302 interconnecting independent computers 304, 306, 308 operating on the same or different platforms. Each computer 304, 306, and 308 is running a VM instance of a single application that reads and/or writes to data in a database on the server 302. For example, the server 302 may include a dynamic database for stock prices in a trading scenario where the connected computers 304, 306, and 308 may be used to complete stock transactions through the server using a uniform software package.

Figure 10A:
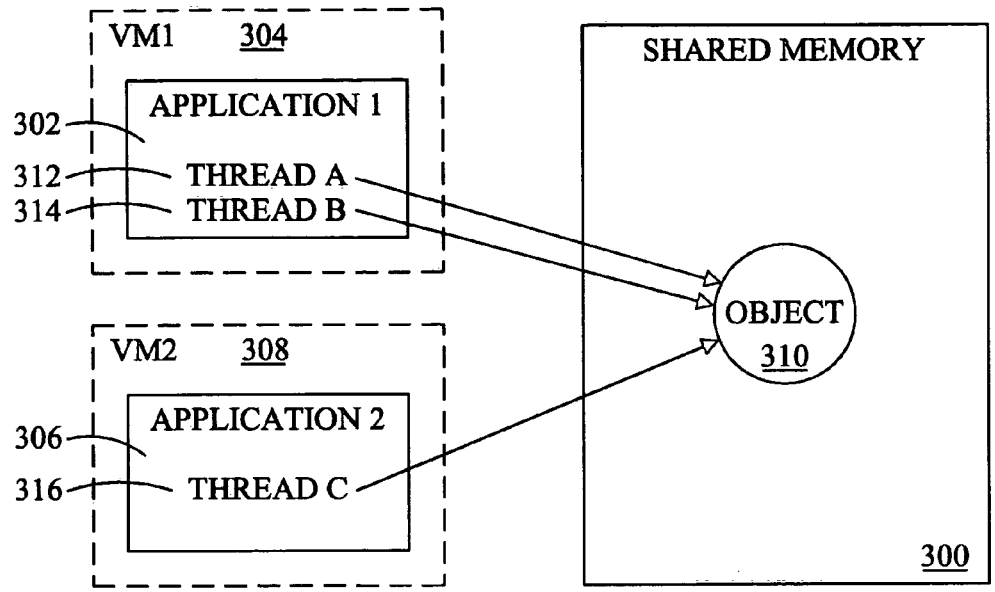
FIGS. 10A and 10B show a system for synchronizing locks on objects shared in a shared object space.

As stated previously, when multiple threads from multiple applications are sharing objects in a shared object space, access to the objects should be synchronized. FIG. 10A illustrates this necessity. In this figure, application 302 is running in a VM 304 while application 306 is running in another VM 308. Both VM 304 and VM 308 are sharing the shared object space 300 that is storing a shared object 310. In this figure, application 302 is simultaneously running two threads, thread 312 and thread 314, both of which are calling shared object 310. At the same time, application 308 is running a thread 316 which also is calling the shared object 310. Absent synchronization, each thread 312, 314, and 316 could all access the shared object and make simultaneous, possibly conflicting changes to the object 310 without any knowledge of each other's changes.

Also, as stated previously, existing methods provide for synchronization of multiple threads in a single application accessing a shared object in a single VM. Extended synchronization techniques, as described herein, may be used to provide synchronization for concurrent access to objects in shared memory by multiple applications illustrated in FIG. 10B.

Figure 10B:
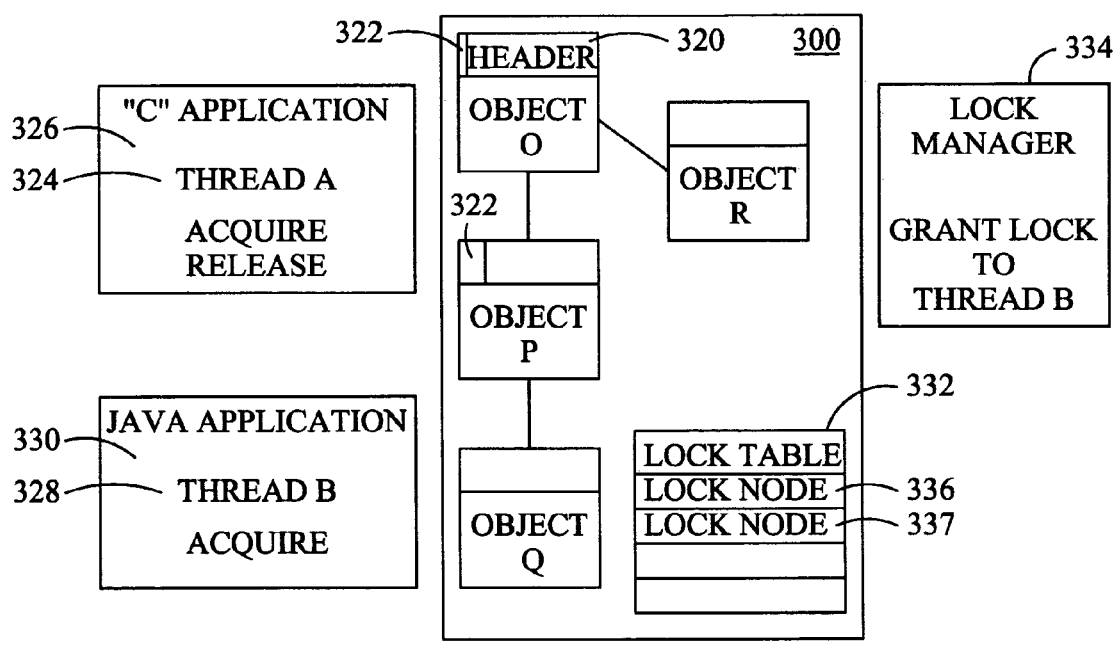

In FIG. 10B, a shared object space 300 stores objects O, P, Q, and R. Each of these objects includes an object header 320. Each object header 320 may include a lock info field 322 which is used to indicate whether a thread of an application has locked that object. The lock info field 322 may contain either a "cheap lock" or a reference to a "lock node", i.e. an "expensive lock." A "cheap lock" directly encodes the identity of the application and the thread that owns the lock by inserting a value into the lock info field 322 unique to the thread of that application. (The value "0" may be used to indicate that an object is not locked by any thread of any application.) When thread A of application 326 seeks to acquire object O, for example, thread A checks the header of object O to test whether the value in the lock info field 322 is "0", representing that it is not locked. If the value is "0" then thread A 324 substitutes its unique number in the header of object O and acquires the lock with a "cheap lock."

This compare and swap informs subsequent threads that wish to acquire object O that the object is "locked" and these threads will wait. This compare and swap is preferably "atomic" in nature, meaning that the issued command(s) is performed in such a manner that there is no potential for another thread or otherwise to lock the object in the interim, especially when the command is executed by the processor. In many cases, the swap is performed in a manner internal to the microprocessor, and is accordingly a very efficient mechanism. For example, if thread B 328 seeks to acquire the object O while thread A 324 already has it, thread B will test to see whether the lock info field 322 is "0". The test will fail and thread B will recognize that thread A has the object because of the number in the header. At this point, thread B does several things. Thread B makes two entries in a lock table 332 called "lock nodes" 336 and 337. The lock node 336 is unique to thread A and the lock node 337 is unique to thread B. Also, thread B updates the "cheap lock" of the lock info field 322 to an "expensive lock" that contains a reference to the lock node 336 in the lock table 332. Thread B then goes to sleep waiting on its lock node 336. When thread A is finished it notifies the lock manager 334 which removes the lock node 336 from the lock table and swap's B's "expensive lock". i.e. a reference to the lock node 337, into the lock info field 322 of the object's header. Thread B thereby gains control of the object.

A lock node, such as 336 and 337, is an internal object, not visible to the application. When a lock node is created, it is added to the lock table 332. If a thread of an application wanting to acquire the lock must Wait for another thread to release the lock, it waits on the unique lock node object representing its lock request. The lock table 332 holds instances of lock nodes. A given lock node in the table represents either a thread that currently holds a lock or a thread that is waiting to acquire a lock. The lock node contains information pertaining to the virtual machine that has or wants the object, as applicable, the thread that has or wants the object, as applicable, and the object had or wanted, as applicable. When the lock manager 334 successfully grants a lock to a thread by setting the target object's lock info field 322 to be a reference to the lock node representing the waiting thread, using the compare and swap technique, it signals the lock node. The waiting thread then gets the object and proceeds.

All of the aforementioned activities of thread B occur without any effect on thread A. Stated differently, thread A is unaware of anything that B is doing and hence is not slowed down by thread B's activities. When thread A is finished and seeks to release the lock on object O, it will check the lock node 336 and see that there are one or more threads waiting for access to the object O. A first assumes that the lock is still a "cheap lock" and does a compare and swap. If the lock has been updated to an expensive lock, its value is no longer in the lock info field, so the test and swap will fail. In that case, two implementations might occur.

In the first implementation, the object's lock info field is set to "0" and the lock manager is signaled that there may be another lock node in the lock table that can be granted the lock. (This is generally faster for the application thread). The lock manager 334 will then consult the lock table to see which thread has priority, in this case thread B, and therefore grant thread B access to object O, at which point thread B's "expensive lock" will be inserted in the header of object O, etc. The second implementation is that the thread, i.e. A, does the work of determining the next owner of the lock and atomically changes the object's lock info field 322 from a reference to its lock node to a referenced to the next owner's lock node. This eliminates the need for a lock manager, at the expense of making the application slower.

The following is an example of a Java program fragment that might be used to invoke the procedures described above:

```
Lockservice.synchronize (
    anObject,new Runnable ( ) {
        Lockservice.notify (anObject);
        Lockservice.wait (anobject);
    }
);
```

The following is an example of a C fragment that may be used to invoke the procedures described above:

```
Status = gfacquireLock(employee)
doWork
gfReleaseLock(employee)
```

The foregoing example illustrated the process that would occur if two threads were contending for access to the same object. Obviously there may be quite a few threads seeking access to an object simultaneously, and in that event the foregoing procedure will control the priority of access in an orderly fashion through the lock table 332 which records the relative priority of access to an object between multiple threads. In the foregoing example, access to an object by multiple threads is granted in order of the requests, i.e. first come, first served. Other systems may be used. For example, some systems may provide for threads to be indicated as priority threads whose function is of some critical importance, and their place in the lock table accordingly bumped up. In some cases there is no guarantee to priority of access, so that if threads B. C. and D all try to obtain a lock while thread A has it, thread B may not be next in line even if it were the first to try to obtain the lock with respect to threads C and D.

The advantage of the foregoing system is a considerable boost in speed. For example, when there is no contention for an object at the time a thread is trying to acquire it, the object may be obtained by a thread in as little as 10 microseconds. Where there is contention, however, it may take more than 100 microseconds to acquire the object after it has been released. Thus the ability to quickly detect whether or not there is contention for an object permits a thread to acquire the object by the quicker method.

FIG. 10B shows that object O is the parent of objects P and R and object P is the parent of object Q. Objects O, P, Q, and R each have headers with a lock info field 332. Therefore, threads are able to obtain object Q, for example, without needing to lock any of the other objects, freeing them for use by other threads.

One proposed addition to the Java code is a "Queue," class comprising a number of Queue objects, each proposed to be a Collection type object that holds elements prior to processing. The queue is proposed to be any one of a number of predefined types, such as a DelayQueue, a LinkedBlockingQueue, a PriorityBlockingQueue, a SynchronousQueue, or an ArrayBlockingQueue, to name a few. In addition the queue may be customized to provide additional features not defined in predefined queues.

Although the proposed Queue class is intended to provide additional functionality to programmers of applications running in isolated VMs, the present inventors have realized that the disclosed shared object space may be used to implement queues in ways that provide much greater or more efficient functionality to applications using that shared object space.

Figure 11:
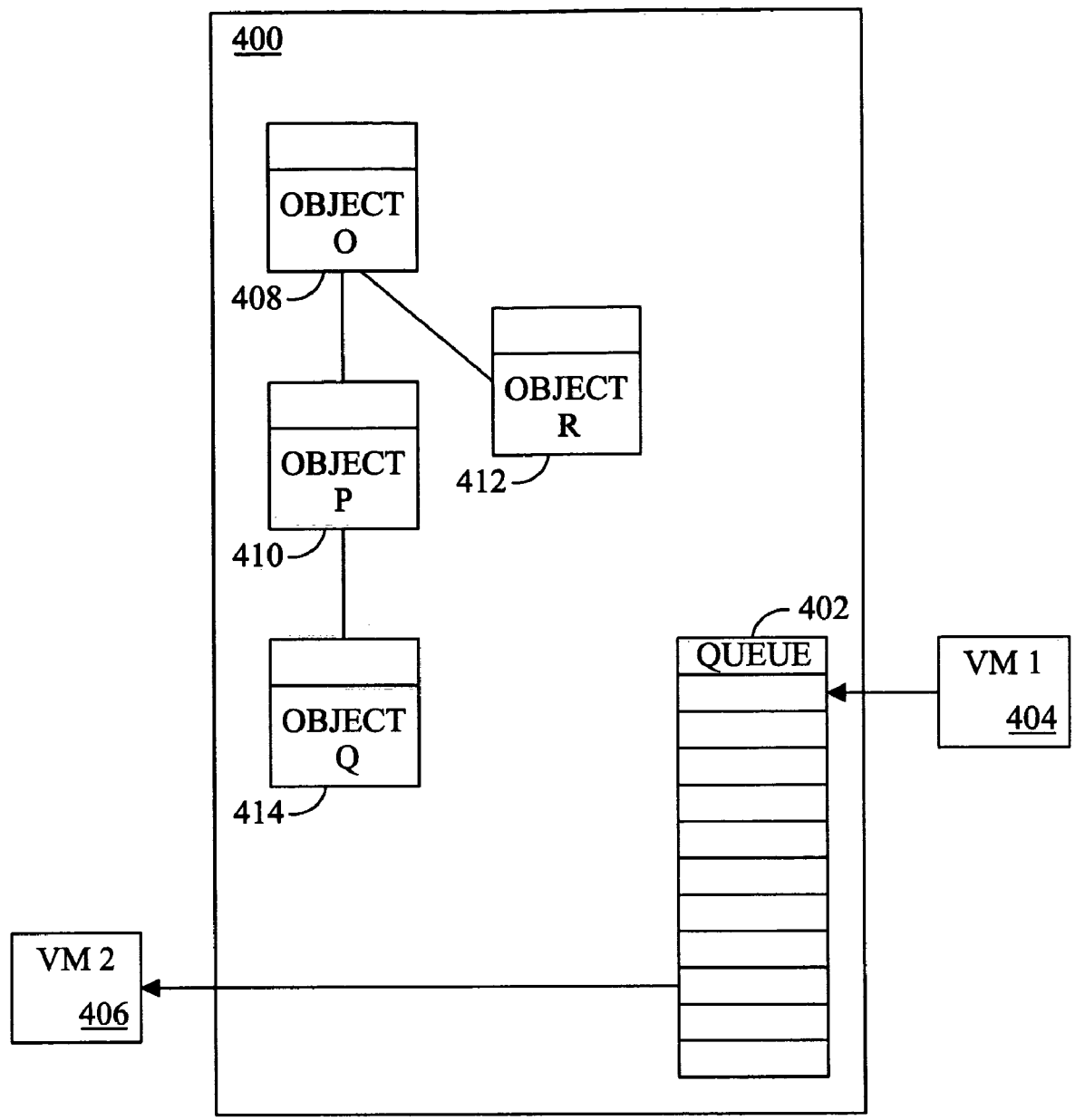
FIG. 11 shows a shared object space having a queue that receives data from one application and returns data to another application.

FIG. 11 shows one such implementation where a shared object space 400 includes a shared queue 402 that is shared by a plurality of applications such as 404 and 406. The shared object space 400 includes one or more objects such as 408, 410, 412, and 414 that are available for placement in the queue 402. In this implementation, the application 404 "places" selective objects in the queue 402 in a desired order by inserting references to the objects into the queue 402. Objects are removed from the queue for processing however, by application 406. In other words, the applications 404 and 406 are sharing the queue.

Though the queue will typically be a FIFO type queue (first in, first out), other types of queues may provide for different operations such as LIFO (last in, first out) among others through the selective designation of a predefined queue object or the custom design of a queue object. Moreover, though the implementation of FIG. 11 assumes that objects are "placed in" the queue by inserting a reference to the object in the queue, other implementations are conceivable, such as copying the object into the queue or inserting any code unique to that object into the queue.

It should be understood that each of the applications 404 and 406 may be expanded to include a series of applications, each running in a separate VM but interconnected through the shared object space 400. Thus FIG. 11 can be seen as an example where one set of one or more applications are inserting objects into the queue while another set of one or more applications are removing objects from the queue for processing.

Figure 12:
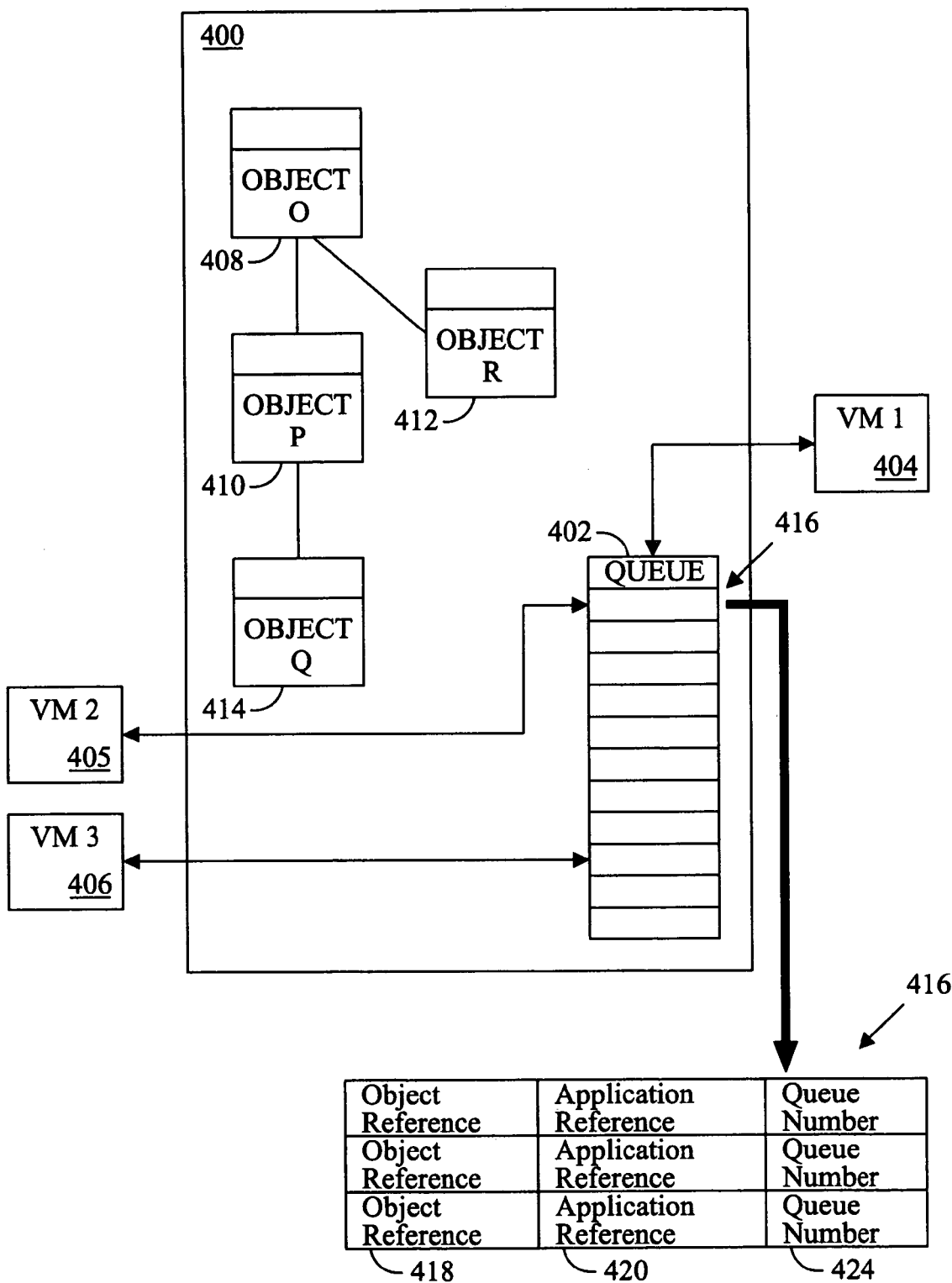
FIG. 12 shows a shared object space having a queue that receives and returns data to a plurality of applications.

The implementation shown in FIG. 11 may be used in a number of practical applications. For example, assume that a law firm uses billing software installed on each attorney's computer along with a billing assistant's computer, where each installation runs in its own VM. In that circumstance, each attorney could enter his or her billing time piecemeal into the queue while the billing assistant could remove items from the queue to process into a series of organized billing statements. Alternatively, assume that applications 404 and 406 are each representative of a set of interconnected stock exchange applications each running in a separate VM but able to access a shared object space on a network server. In that instance, customers could enter a series of piecemeal sell or buy orders while a stock broker could implement an application that matches the orders into transactions by removing items from the queue and processing the information FIG. 12 shows yet another configuration that demonstrates the utility of a shared object space 400 that includes a shared queue 402 accessible to an arbitrary number of applications such as 404, 405, and 406. In this example, each of the applications 404, 405, and 406 places and removes items into the queue in a desired order specific to that application. Applications 404, 405, and 406 are not only able to share the queue, but share the references in the queue through the use of an expanded queue reference cell 416 having a variable number of fields.

To illustrate, assume that application 404 wants to insert object 408 into the queue 402 and that object 408 will be the $3^{rd}$ item that application 404 has inserted. First application 404 may obtain a lock on the queue in manner previously described and search the queue to see if it already contains a reference to object 408. Assume that it does not. Application 404 will then add that reference by including an object reference (such as the address of the object 408) along with a reference that uniquely identifies application 404 (such as the "cheap lock" identifier described earlier or another identifier unique to application 404) and a queue number (in this case 3 because it is the third item that it has placed in the queue).

Now assume that application 405 also wishes to insert object 408 into the queue. Application 405 will obtain a lock on the queue, and its search will indicate that a reference to object 408 already exists, at which point application 405 will insert its application reference and queue number (say 8) into an additional field of the cell 416 and release the lock on the queue.

When application 404 removes object 408 from the queue for processing, application 404 may first remove its field from the cell 416, and because there is still another field in the cell representing that application 405 still needs it, application 404 will return the reference to object 408 to the queue once it is finished processing the object 408. In many cases, the application 404 may lock the queue before removing such data. Alternatively, application 404 may return the reference immediately after removing its field and obtain a lock on object 408 so that application 405 will have to wait in the circumstance that application 405 removes the reference to object 408 for processing while application 404 is still using it.

Later, when application 405 does remove the reference to object 408 from the queue it also will remove its field from the cell 416, and because there is no other field in the cell, will not return the cell to the queue because, in this example, no other application needs it. This example therefore illustrates that the shared object space 400 permits not only a queue to be shared, but also permits the references or objects in the queue to be shared as well, rather than duplicated.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the invention is defined and limited only the claims that follow.

The invention claimed is:

1. A system for concurrent operation of plural computer applications, said system comprising:
   (a) a computer storage medium including a shared object space selectively connectable to each of a plurality of computer applications, said shared object space capable of storing:
      (i) a plurality of objects accessible to each of said plural computer applications connected to said shared object space; and
      (ii) a queue associated with said shared object space and capable of storing a plurality of references to objects, a reference to an object received from one of said plural computer applications and identifying an individual object and said application placing said reference to said individual object in said queue; and
   (b) at least one computer comprising at least two computer applications concurrently executing on respective virtual machines, a particular object updateable by a first of said concurrently executing applications when said first application is connected to said shared object space and a datum in said object identifies a reference from said queue, said reference identifying said first application, said first application relinquishing control of said particular object enabling updating of said particular object by another application with replacement of said datum in said particular object with another datum that identifies another reference in said queue, said another reference identifying said another application, said first application and said another application not communicating with each other regarding said reference and said another reference;
   where said reference to an object further comprises an indication of a position of said reference in a sequence of references to objects placed in said queue by an application.

2. The system of claim 1 where said queue is a predefined type.

3. The system of claim 1 where said queue is customized.

4. The system of claim 1 where said queue is a "first-in-first-out" queue.

5. The system of claim 1 where said queue is a "last-in-first-out" queue.

6. The system of claim 1 where each said virtual machine comprises a computer executable instruction in conformance with a virtual machine specification, said instruction executing on said computer.

7. The system of claim 6 where said shared object space is connected to each said virtual machine through a Native Method Interface.

8. The system of claim 7 where said system includes a default directory with a native language library file.

9. The system of claim 1 where said shared object space is operably connectable to a non-object-oriented application.

10. The system of claim 9 where said non-object oriented application is a "C" program.

11. The system of claim 1 where access to at least one of said plurality of objects by said plural computer applications is synchronized.

12. The system of claim 1 where said plural computer applications pertain to at least one of:
   (a) stock trading;
   (b) communications processing; and
   (c) internet services.

13. The system of claim 1 where at least one of said plurality of objects is copy shared among said plural applications.

14. The system of claim 1 where at least one of said plurality of objects is direct shared among said plural applications.

15. A system for concurrent operation of plural computer applications, said system comprising:
   (a) a computer storage medium including a shared object space selectively connectable to each of a plurality of computer applications, said shared object space capable of storing:
      (i) a plurality of objects accessible to each of said plural computer applications connected to said shared object space; and
      (ii) a queue associated with said shared object space and capable of storing a plurality of references to objects, each reference identifying an individual object and a computer application placing said reference to said individual object in said queue; and
   (b) at least one computer comprising at least two computer applications concurrently executing on respective virtual machines, a particular object updateable by one of said concurrently executing applications when said application is connected to said shared object space and a datum in said object identifies an object reference from said queue, said object reference identifying said updating application; one of said computer applications of a first set placing a first reference to a particular object in said queue and relinquishing control of said particular object enabling updating of said particular object by one of a second set of applications with replacement of a datum in said particular object with another datum that identifies a second reference in said queue, said second reference identifying said application of said second set said one of said applications of said first set and said one of said applications of said second set not communicating with each other regarding said reference to said particular object.

16. The system of claim 15 where said queue is a predefined type.

17. The system of claim 15 where said queue is customized.

18. The system of claim 15 where said queue is a "first-in-first-out" queue.

19. The system of claim 15 where said queue is a "last-in-first-out" queue.

20. The system of claim 15 where each said virtual machine comprises a computer executable instruction in conformance with a virtual machine specification, said instruction executing on said computer.

21. The system of claim 20 where said shared object space is connected to each said virtual machine through a Native Method Interface.

22. The system of claim 21 where said system includes a default directory with a native language library file.

23. The system of claim 15 where said shared object space is operably connectable to a non-object-oriented application.

24. The system of claim 23 where said non-object oriented application is a "C" program.

25. The system of claim 15 where access to at least one of said plurality of objects by said plural computer applications is synchronized.

26. The system of claim 15 where said plural computer applications pertain to at least one of:
 (a) stock trading;
 (b) communications processing; and
 (c) internet services.

27. The system of claim 15 where at least one of said plurality of objects is copy shared among said plural applications.

28. The system of claim 15 where at least one of said plurality of objects is direct shared among said plural applications.

29. A system for the concurrent operation of plural computer applications, said system comprising:
 (a) a computer storage medium including a shared object space selectively connectable to each of a plurality of computer applications, said shared object space capable of storing:
  (i) a plurality of objects accessible to a plurality of said plural computer applications connected to said shared object space; and
  (ii) a queue associated with said shared object space and capable of storing a plurality of references to objects, each reference to an object received from one of said plural computer applications and identifying an individual object and an application capable of removing said reference from said queue; and
 (b) at least one computer comprising at least two computer applications concurrently executing on respective virtual machines, a particular object updateable by one of said concurrently executing applications when said one application is connected to said shared object space and in control of a reference from said queue identifying said particular object, said one application removing said reference to said particular object from said queue and returning said reference to said particular object to said queue if said queue contains an identity of another application seeking to remove said reference from said queue, said one application and said another application not communicating with each other regarding said reference;
 wherein said reference to an object further comprises an indication of a position of said reference in a sequence of references received in said queue from said application placing said reference in said queue.

30. The system of claim 29 where said queue is a predefined type.

31. The system of claim 29 where said queue is customized.

32. The system of claim 29 where said queue is a "first-in-first-out" queue.

33. The system of claim 29 where said queue is a "last-in-first-out" queue.

34. The system of claim 29 where each said virtual machine comprises a computer executable instruction in conformance with a virtual machine specification, said instruction executing on said computer.

35. The system of claim 34 where said shared object space is connected to each said virtual machine through a Native Method Interface.

36. The system of claim 35 where said system includes a default directory with a native language library file.

37. The system of claim 29 where said shared object space is operably connectable to a non-object-oriented application.

38. The system of claim 37 where said non-object oriented application is a "C" program.

39. The system of claim 29 where access to at least one of said plurality of objects by said plural computer applications is synchronized.

40. The system of claim 29 where said plural computer applications pertain to at least one of:
 (a) stock trading;
 (b) communications processing; and
 (c) internet services.

41. The system of claim 29 at least one of said plurality of objects is copy shared among said plural applications.

42. The system of claim 29 where at least one of said plurality of objects is direct shared among said plural applications.

* * * * *